May 22, 1951 W. H. GILLE 2,553,760
ALTERNATING CURRENT MOTOR
Filed Dec. 31, 1949
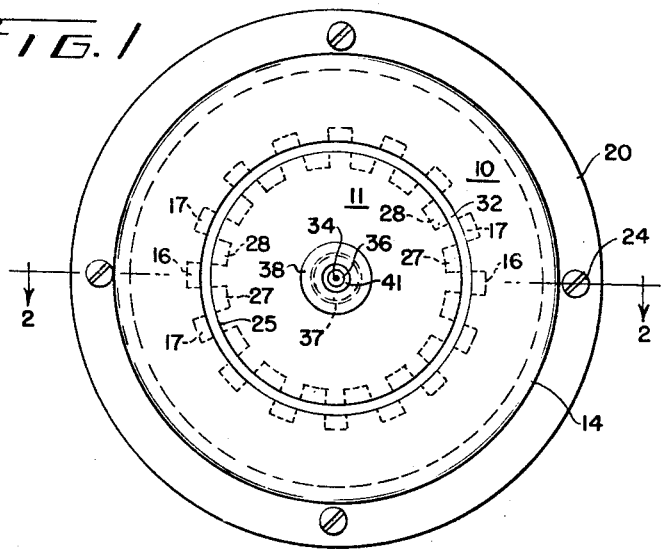
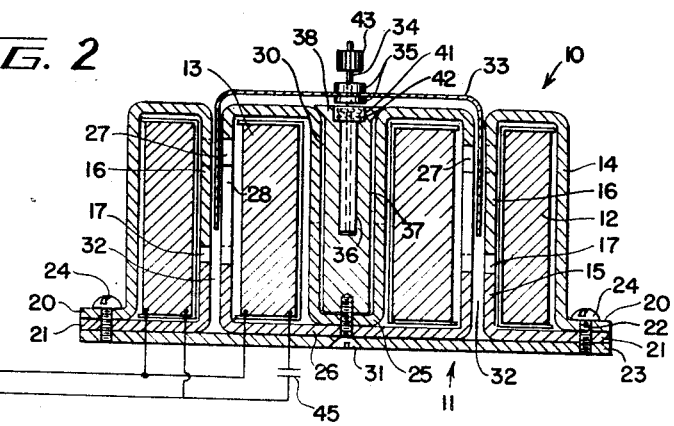
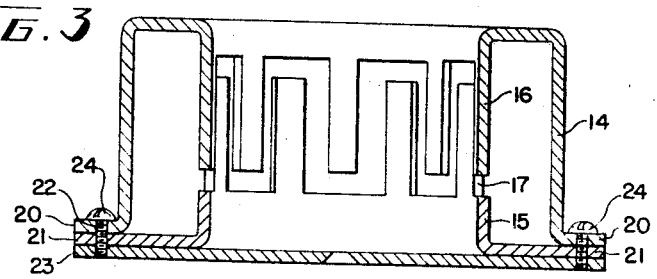
Inventor
WILLIS H. GILLE
By George H. Fisher
Attorney Patented May 22, 1951

2,553,760

UNITED STATES PATENT OFFICE 2,553,760

ALTERNATING CURRENT MOTOR

Willis H. Gille, St. Paul, Minn., assignor to Minneapolis-Honeywell Regulator Company, Minneapolis, Minn., a corporation of Delaware Application December 31, 1949, Serial No. 136,384

11 Claims. (Cl. 172—278)

1

This invention relates to an alternating current motor and more particularly to a motor of the two phase or split phase type employing two independent stator elements with single energizing windings for each stator.

Motors of this type, while known in the art, have never been too practical because of the arrangement of stator and rotor elements requiring either a rotor element enclosing a larger portion of the stators or completely concealed within stator elements. In either case assembly of parts, the mounting of the motor and the difficulty of maintenance were disadvantageous.

The present invention provides an improved and simplified arrangement in the assembly of stators and rotor which is economical to manufacture and maintain and which presents no mounting problem.

It is also an object of this invention to provide in a motor of this type a compact structure of parts which is readily adapted for fabrication by stamping.

These and other objects will become evident upon a reading of the attached description together with the drawings, wherein:

Figure 1 is a plan view of the motor with the rotor removed;

Figure 2 is a sectional view of the motor taken along the line 2—2 of Figure 1 and including a section of the rotor to show the relationship of the parts; and Figure 3 is a sectional view of one of the stators of the motor showing the relationship of its parts.

The alternating current motor illustrated in the drawings is provided with a pair of stator elements 10, 11 which are magnetically independent of one another. Each of the stator elements 10, 11 is energized from a single energizing winding 12, 13 respectively, as can be seen in the drawings. The stators 10, 11 and their respective windings 12, 13 are annular in form and have different diametrical dimensions so that one may be mounted inside the other to reduce substantially the over-all dimensions of the motor.

Stator element 10 is formed of two pole piece members 14, 15 which encircle and enclose the energizing winding 12. Each of the pole piece members 14, 15 have a plurality of pole pieces 16, 17 respectively which emanate from one extremity thereof. As shown in the drawings, each of the pole piece members 14, 15 have eight such pole pieces 16, 17 respectively thereon. The pole piece members 14, 15 and consequently their respective poles 16, 17 are energized from one or the other of the extremities of coil 12 such that the pole pieces 16, 17 have instantaneous opposite polarities.

2

The plurality of pole pieces 16, 17 of the pole piece members 14, 15 are equally spaced apart a distance which is slightly greater than 3 times the width of the pole piece and when the pole piece members 14, 15 are assembled on the coil 12 the pole pieces 16, 17 form a cylindrical surface with the pole pieces of one of the pole piece members extending toward and between the pole pieces on the opposite pole piece member. In this assembled relationship, pole pieces 16, 17 forming the cylindrical surface have a spacing between the respective pole piece members in a circumferential direction which is substantially equal to the width of the pole piece, as can be seen in Figure 3. Further the pole piece members 14, 15 in assembled position provide a spacing in an axial direction between the pole teeth, this spacing or air gap being sufficient to keep flux lines set up in the magnetic circuit of the stator element 10 from bridging this portion of the magnetic circuit. The purpose of this spacing will become evident as the disclosure proceeds.

As shown in Figures 2 and 3, the pole piece members 14, 15 are generally annular in form and are bent, as by stamping, to conform with the sides of the coil 12. The pole piece member 14 contacts and conforms with three sides of the coil 12 and includes an outwardly extending flange portion 20, the purpose of which will be later described. The pole piece member 15 is similarly bent to conform with two sides of the coil 12 and also includes a cylindrical flange portion 21 of substantially the same dimensions as the flange 20. The flange portions 20, 21 of the pole piece members 14, 15 are provided with apertures 22 therein by means of which the pole piece members may be secured to a non-magnetic mounting plate 23 by means of a plurality of screws 24. When assembled, the pole piece members 14, 15 of stator element 10 are secured to the non-magnetic plate 23 by the screws 24 in such a manner that the pole piece members encircle the coil and the pole pieces 16, 17 thereon are properly spaced from one another.

The stator element 11, similar to stator element 10, includes a pair of pole piece members 25, 26 which enclose and encircle the energizing winding 13. Each of the pole piece members 25, 26 have a plurality of pole pieces 27, 28 formed in one extremity of the pole piece members. The pole piece members 25, 26 are also provided with eight such pole pieces 27, 28 which are equally spaced on the respective pole piece members. When assembled the pole pieces 27, 28 of pole piece members 25, 26 are, similar to stator 10, spaced apart from one another in the circumferential direction a distance or width of one pole piece and in an axial direction a distance sufficient to prevent the flux lines of the magnetic circuit of this stator from bridging this portion of the magnetic circuit. When coil 13 is energized, the pole pieces 27, 28 are magnetized with an opposite instantaneous polarity since the respective pole piece members are common to opposite ends of the energizing coil 13.

Like pole piece member 14, the pole piece member 25 contacts or is common to the three surfaces of coil 13 and pole piece member 26, like pole piece member 15, is common to and conforms to two surfaces of coil 13. These pole piece members are also bent or stamped to so conform to the winding. The pole piece member 25 when so formed provides a deep cylindrical aperture 39. Because such a stamping operation requires a rather deep draw, it may be feasible to form the member 25 into two parts in which case the parts would be in abutting relationship to eliminate any air gap in this member. Pole piece members 25, 26 are secured to a nonmagnetic mounting plate 23 by means of a screw 31 threaded into tapped apertures in the members. When assembled upon the nonmagnetic plate 23, the pole piece members 25, 26 will be so positioned that the pole pieces 27, 28 thereon are located opposite the spacing between the pole pieces 16, 17 of the stator element 10. Further the pole pieces 27 and 28 will be so positioned with respect to pole pieces 16, 17 that the pole pieces from like polarity ends of the respective coils 12, 13 will be positioned adjacent to one another.

The stator elements 10, 11 of this motor, since they have different diametrical dimensions, will provide an annular air gap 32 when the respective pole piece members and coils of the stators are mounted on the mounting plate 23. Only that portion of the air gap 32 which is between the pole pieces 16, 17, 27 and 28 will be effective, however, to act upon a rotor.

The motor in this design is provided with a cup-shaped rotor 33 which fits into the annular air gap and extends through the portion of the air gap 32 which is located between the pole pieces of the stators. Rotor 33 is mounted on a shaft 34 by means of press fitted bushings 35, the shaft in turn being journaled in a sleeve type bearing 36 housed in a bearing support 37 located in the cylindrical aperture 39 in pole piece member 25. The bearing support 37 is cylindrical in form and has a flange 38 at its upper extremity which abuts against the upper portion of pole piece member 25. The lower extremity of bearing support 37 is tapped to receive the screw 31 which secures the pole piece members 25, 26 to plate 23. In this manner the bearing support 37 is also secured to the nonmagnetic plate 23 and the flange 38 of the bearing support 37 assists in holding the pole piece members 25, 26 in assembled relationship. At the upper end of bearing support 30 there is located an aperture 41 in which a felt lubricating pad 42 is located, this pad providing lubrication for the shaft 34 in the sleeve-type bearing 36. At the opposite extremity of the shaft 34 is located a pinion 43 by means of which the motor can be attached to its load. Rotor 33 may be of magnetic or electrically conductive material depending upon the type of motor which is desired. In the present design the hardened steel rotor was used to give a synchronous motor.

In operation, this motor is similar to a split phase or two phase type of alternating current motor. The windings 12, 13 may be energized from a two phase source or as is shown in Figure 2 from a single phase source through a condenser 45 in a well known manner. When the windings are so energized, there is a phase displacement between the energizing currents for the respective windings and hence the flux fields generated by the respective windings will likewise be displaced. With the arrangement and spacing of the pole pieces on the stators as described above, a rotating flux field is obtained across the air gap between the pole pieces, the rotation of which field is dependent upon the phase displacement between the exciting currents. The pole piece members 25, 26 and 14, 15 of stators 10, 11 are positioned in close proximity to one another to provide an annular air gap 32 which is small in comparison to the spacing between pole pieces of the respective stators. In this manner there is assured a transfer or flow of flux lines across the air gap in which the rotor is positioned rather than a bridging effect between each of the magnetic stators. The rotating flux field thus formed will act upon the rotor element to cause rotation thereof in a well known manner.

In considering this invention it should be kept in mind that the present disclosure is intended to be illustrative only and the scope of the invention is to be determined only by the appended claims.

I claim as my invention:

1. In an alternating current motor, a plurality of stator members each having a single phase coil and an independent magnetic circuit, each of said magnetic circuits comprising a pair of pole piece members which encircle said coils and have pole pieces thereon which are disposed in a cylindrical surface in close proximity to an axial surface of said coils, said pole pieces on said respective pole piece members extending toward and being spaced from one another, said stators having different diametrical dimensions and being disposed concentric with one another with the pole pieces thereon in closely spaced relationship to define an annular air gap therebetween, and a rotor magnetically associated with said stator members.

2. In an alternating current motor, a plurality of stator members each having a single phase coil and an independent magnetic circuit, each of said magnetic circuits comprising a pair of pole piece members which encircle said coils and having pole pieces thereon which are disposed in a cylindrical surface, said pole pieces on said respective pole piece members extending toward and being spaced from one another, said stators having different diametrical dimensions and being disposed concentric with one another with the pole pieces thereon in closely spaced relationship to define an annular air gap therebetween, and a rotor magnetically associated with said stator members.

3. In an alternating current motor, a plurality of stator members each having a single phase coil and an independent magnetic circuit, each of said magnetic circuits comprising a pair of pole piece members which encircle said coils and having pole pieces thereon which are disposed in a cylindrical surface, said pole pieces on said respective pole piece members extending toward one another and being separated by an air gap, said stators having different diametrical dimensions and being disposed concentric with one another with the pole pieces thereon in closely spaced relationship to define an annular air gap therebetween, and a rotor magnetically associated with said stator members, said first air gap being larger than said annular air gap.

4. In an alternating current motor, a plurality of stator members each having a single phase coil and an independent magnetic circuit, said coils being adapted to be energized by alternating currents displaced in phase from one another, each of said magnetic circuits including a pair of pole piece members which encircle said coils, a plurality of pole pieces carried by each of said pole piece members, said pole pieces on said pole piece members being disposed in a cylindrical surface in proximity to an axial surface of said coils and extending toward and spaced from one another, said stators having different diametrical dimensions and being disposed concentric with one another with the pole pieces on the said respective stators in closely spaced relationship to define an annular air gap therebetween, and a rotor of magnetic material mounted for rotation in said annular air gap.

5. In an alternating current motor, a plurality of stator members each having a single phase coil and an independent magnetic circuit, said coils being adapted to be energized by alternating currents displaced in phase from one another, each of said magnetic circuits including a pair of pole piece members which encircle said coils, a plurality of pole pieces carried by each of said pole piece members, said pole pieces on said pole piece members being disposed in a cylindrical surface in proximity to an axial surface of said coils extending toward one another and being separated by an air gap, said stators having different diametrical dimensions and being disposed concentric with one another with the pole pieces on the said respective stators in closely spaced relationship to define an annular air gap therebetween, said first named air gap being larger than said annular air gap, and a rotor of magnetic material mounted for rotation in said annular air gap.

6. In an alternating current motor, a plurality of stator members each having a single phase energizing coil and independent magnetic circuit, each of said magnetic circuits including a pair of pole piece members which encircle said respective coil, a plurality of pole pieces formed on each of said pole piece members and spaced apart a distance substantially equal to the width of three pole pieces, said pole pieces on said pairs of pole piece members being disposed in a cylindrical surface adjacent an axial surface of their respective coil and extending toward one another, means energizing said coils with alternating phase currents of the same frequency to induce in the pole pieces of one stator instantaneous and opposite polarities and between the pole pieces of the two stators polarities displaced in phase from one another, said stators having different diametrical dimensions from one another being disposed concentric with one another with the pole pieces on said respective stators in closely spaced relationship to define an annular air gap therebetween, and a rotor of magnetic material magnetically associated with said pole pieces in said annular air gap.

7. In an alternating current motor, a plurality of stator members each having a single phase energizing coil and independent magnetic circuit, each of said magnetic circuits including a pair of pole piece members which encircle said respective coil, a plurality of pole pieces formed on each of said pole piece members and spaced apart a distance substantially equal to the width of three pole pieces, said pole pieces on said pairs of pole piece members being disposed in a cylindrical surface adjacent an axial surface of their respective coil and extending toward one another, means energizing said coils with alternating phase currents of the same frequency to induce in the pole pieces of one stator instantaneous and opposite polarities and between the pole pieces of the two stators polarities displaced in phase from one another, said pole piece members being secured to a non-magnetic base and arranged so that the pole pieces of said respective stator members define an annular air gap, and a rotor of magnetic material mounted for rotation within said annular air gap.

8. In an alternating current motor, a plurality of stator members each having a single phase coil and an independent magnetic circuit, each of said magnetic circuits including a pair of pole piece members which encircle said coil and having pole pieces thereon which are disposed in a cylindrical surface adjacent an axial surface of said coil, said pole pieces on said respective pole piece members extending toward one another and being separated by an air gap, means mounting said pole piece members and said stators to a nonmagnetic base to provide an annular air gap defined by the pole pieces of said respective stator members, and a rotor of magnetic material disposed within said annular air gap.

9. In an alternating current motor, a plurality of stator members each having a single phase coil and an independent magnetic circuit, each of said magnetic circuits comprising a pair of pole piece members which encircle said coil and having pole pieces thereon disposed in a cylindrical surface, said pole pieces on said respectively pole piece members extending toward one another and being separated by an air gap, means mounting said pole piece members on a non-magnetic base to provide an annular air gap defined by the pole pieces of said respective stator members, said first named air gap being larger than said annular air gap, and a rotor of magnetic material mounted for rotation within said annular air gap.

10. In an alternating current motor, a pair of stator members each having an energizing coil and a plurality of spaced pole pieces alternately common to one or the other extremity of said coil, said stator members being of different diametrical dimension and being mounted concentrically one inside the other, the pole pieces on said stators being positioned in closely spaced relationship to provide an annular air gap therebetween, and a rotor positioned in said annular air gap.

11. In an alternating current motor, a pair of stator members each having an energizing coil and a plurality of spaced pole pieces alternately common to one or the other extremity of said energizing coil, means energizing said coils of said stator members with out-of-phase alternating currents of the same frequency, said stator members having different diametrical dimensions and being mounted concentrically one inside the other, the pole pieces on said stators being positioned in closely spaced relationship to provide an annular air gap therebetween and within the extremities of said coils, and a rotor mounted for rotation within said annular air gap.

WILLIS H. GILLE.

No references cited.